United States Patent
Zeng et al.

(10) Patent No.: US 10,903,969 B2
(45) Date of Patent: Jan. 26, 2021

(54) MODULAR CONTROL CHANNEL FORMATS FOR UPLINK CONTROL INFORMATION IN A CELLULAR COMMUNICATION SYSTEM

(71) Applicant: Apple Inc., Cupertino, CA (US)

(72) Inventors: Wei Zeng, San Diego, CA (US); Yuchul Kim, Santa Clara, CA (US); Dawei Zhang, Saratoga, CA (US)

(73) Assignee: Apple Inc., Cupertino, CA (US)

(*) Notice: Subject to any disclaimer, the term of this patent is extended or adjusted under 35 U.S.C. 154(b) by 53 days.

(21) Appl. No.: 15/918,854

(22) Filed: Mar. 12, 2018

(65) Prior Publication Data

US 2018/0278402 A1     Sep. 27, 2018

Related U.S. Application Data

(60) Provisional application No. 62/475,250, filed on Mar. 23, 2017.

(51) Int. Cl.
| | | |
|---|---|---|
| H04L 5/00 | (2006.01) | |
| H04L 1/16 | (2006.01) | |
| H04W 72/12 | (2009.01) | |
| H04W 72/04 | (2009.01) | |

(52) U.S. Cl.
CPC .......... *H04L 5/0092* (2013.01); *H04L 1/1664* (2013.01); *H04L 1/1671* (2013.01); *H04L 5/0044* (2013.01); *H04L 5/0048* (2013.01); *H04L 5/0053* (2013.01);
(Continued)

(58) Field of Classification Search
CPC combination set(s) only.
See application file for complete search history.

(56) References Cited

U.S. PATENT DOCUMENTS

| | | |
|---|---|---|
| 8,023,474 B2 | 9/2011 | Malladi et al. |
| 9,281,917 B2 | 3/2016 | Rinne et al. |
| 2016/0295584 A1 | 10/2016 | Chen et al. |

(Continued)

FOREIGN PATENT DOCUMENTS

| | | |
|---|---|---|
| WO | 2016093573 | 6/2016 |
| WO | 2018030416 | 2/2018 |
| WO | 2018084137 | 5/2018 |

OTHER PUBLICATIONS

NTT DOCOMO, Inc: "Designs for PUCCH in long duration"; 3GPP Draft; RI-1702812; 3rd Generation Partnership Project (3GPP), Mobile Competence Centre, 650, Route De Lucioles; F-06921 Sophia-Antipolis Cedex; France; vol. RAN WG1, No. Athens, Greece; Feb. 12, 2017; XP051209957; 9 pages.

(Continued)

*Primary Examiner* — Yee F Lam
(74) *Attorney, Agent, or Firm* — Kowert, Hood, Munyon, Rankin & Goetzel, P.C.

(57) ABSTRACT

This disclosure relates to performing cellular communication using modular control channel formats for uplink control information. A wireless device may determine a slot structure for uplink communication. The slot structure may be selected from multiple possible slot structures. Uplink control information may be transmitted via one or more uplink control channel modules during a slot. A number of uplink control channel modules on which uplink control information is transmitted during the slot may be selected based at least in part on the slot structure for uplink control communication.

20 Claims, 8 Drawing Sheets

(52) U.S. Cl.
CPC ... *H04W 72/0446* (2013.01); *H04W 72/1284* (2013.01); *H04W 72/0413* (2013.01)

(56) References Cited

U.S. PATENT DOCUMENTS

| | | | |
|---|---|---|---|
| 2017/0238305 A1 | 8/2017 | Chen et al. | |
| 2018/0049222 A1* | 2/2018 | Manolakos | H04L 27/2602 |
| 2018/0124755 A1* | 5/2018 | Huang | H04L 5/0048 |
| 2018/0139773 A1* | 5/2018 | Ma | H04L 5/0053 |
| 2018/0192416 A1* | 7/2018 | Yin | H04L 1/1607 |
| 2018/0192417 A1* | 7/2018 | Yin | H04L 5/005 |
| 2018/0220414 A1* | 8/2018 | Yin | H04W 72/0413 |
| 2018/0220415 A1* | 8/2018 | Yin | H04W 72/14 |
| 2018/0331807 A1* | 11/2018 | Kim | H04L 29/06 |

OTHER PUBLICATIONS

LG Electronics; "Configuration of long NR-PUCCH resource"; 3GPP Draft; RI-1702482; 3rd Generation Partnership Project (3GPP), Mobile Competence Centre; 650, Route Des Lucioles; F-06921 Sophia-Antipolis Cedex; France; vol. RAN WG1, No. Athens, Greece; Feb. 12, 2017; XP051209636; 5 pages.

International Search Report and Written Opinion, Application No. PCT/US2018/023773, dated Jun. 18, 2018, 14 pages.

\* cited by examiner

MODULAR CONTROL CHANNEL FORMATS FOR UPLINK CONTROL INFORMATION IN A CELLULAR COMMUNICATION SYSTEM

PRIORITY INFORMATION

This application claims priority to U.S. provisional patent application Ser. No. 62/475,250, entitled "Modular Control Channel Formats for Uplink Control Information in a Cellular Communication System," filed Mar. 23, 2017, which is hereby incorporated by reference in its entirety as though fully and completely set forth herein.

FIELD

The present application relates to wireless communications, and more particularly to systems, apparatuses, and methods for performing cellular communication using modular control channel formats for uplink control information.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments are presented herein of apparatuses, systems, and methods for cellular communication using modular control channel formats for uplink control information.

In some instances, cellular communication may be performed in a manner such multiple possible slot structures and/or formats used. Further, at least in some instances, it may be possible to dynamically select from among the possible structures and/or formats. For example, at least according to some embodiments, 5G NR communication systems may support multiple slot structures and formats, e.g., including 7 symbol and 14 symbol slot structures, as well as uplink-only, uplink-centric, downlink centric, and downlink-only slot formats. Such flexibility may facilitate efficient scheduling of transmission slots, at least in some embodiments.

In conjunction with such various possible slot structures and/or formats, a modular system for providing uplink control information may be used. For example, it may be possible to define one or more uplink control channel modules that fit within a 7 symbol slot structure, and to simply use multiple such modules if a 14 symbol slot structure is used, e.g., rather than defining entirely different control channels for different slot structures.

According to some embodiments, it may still be possible to select from multiple possible uplink control channel module structures and/or formats for the uplink control channel modules, e.g., to provide more flexibility in conjunction with different possible slot formats.

For example, uplink control channel module structures having different numbers of symbols may be defined, which may allow for an uplink control channel module structure having more symbols to be selected for a slot format having more available uplink symbols (e.g., to fully utilize the available uplink symbols), while an uplink control channel module structure having fewer symbols to be selected for a slot format having fewer available uplink symbols (e.g., to ensure that the uplink control channel module structure can fit within the available number of uplink symbols of the slot).

As another example, uplink control channel module formats having different arrangements of symbols may be defined, which may allow for an uplink control channel module format having more symbols dedicated to reference signals (and thus fewer symbols dedicated to uplink control information) to be selected in conditions that warrant a greater pilot to data ratio, while an uplink control channel module format having fewer symbols dedicated to reference signals (and thus more symbols dedicated to uplink control information) to be selected in conditions that do not require as high of a pilot to data ratio. Note that formats that are differently ordered with respect to the arrangement of symbols dedicated to reference signals versus symbols dedicated to uplink control information, and/or any of various other possible format variations, are also possible.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
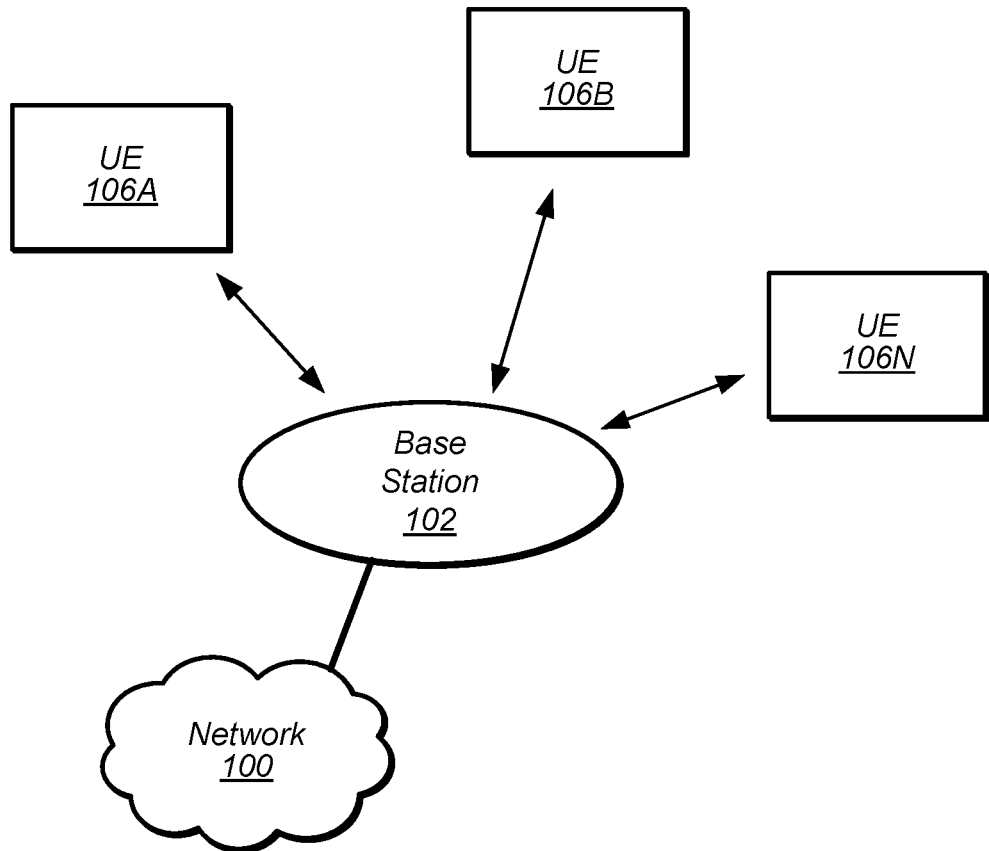
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
LAN: Local Area Network
WLAN: Wireless LAN
AP: Access Point
RAT: Radio Access Technology
IEEE: Institute of Electrical and Electronics Engineers
Wi-Fi: Wireless Local Area Network (WLAN) RAT based on the IEEE 802.11 standards Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices which are mobile or portable and which perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices which perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
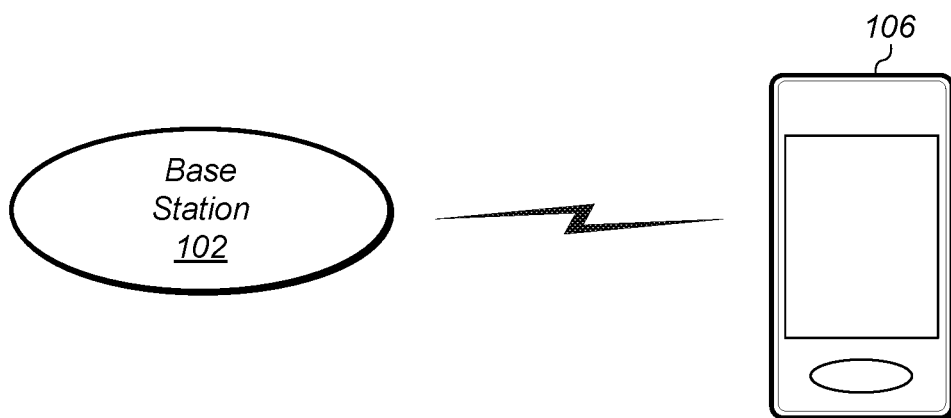
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, WiMAX, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform cellular communication using modular control channel formats for uplink control information, at least according to the various methods as described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a handheld device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or GSM), and separate radios for communicating using each of Wi-Fi and BLUETOOTH™. Other configurations are also possible.

Figure 3:
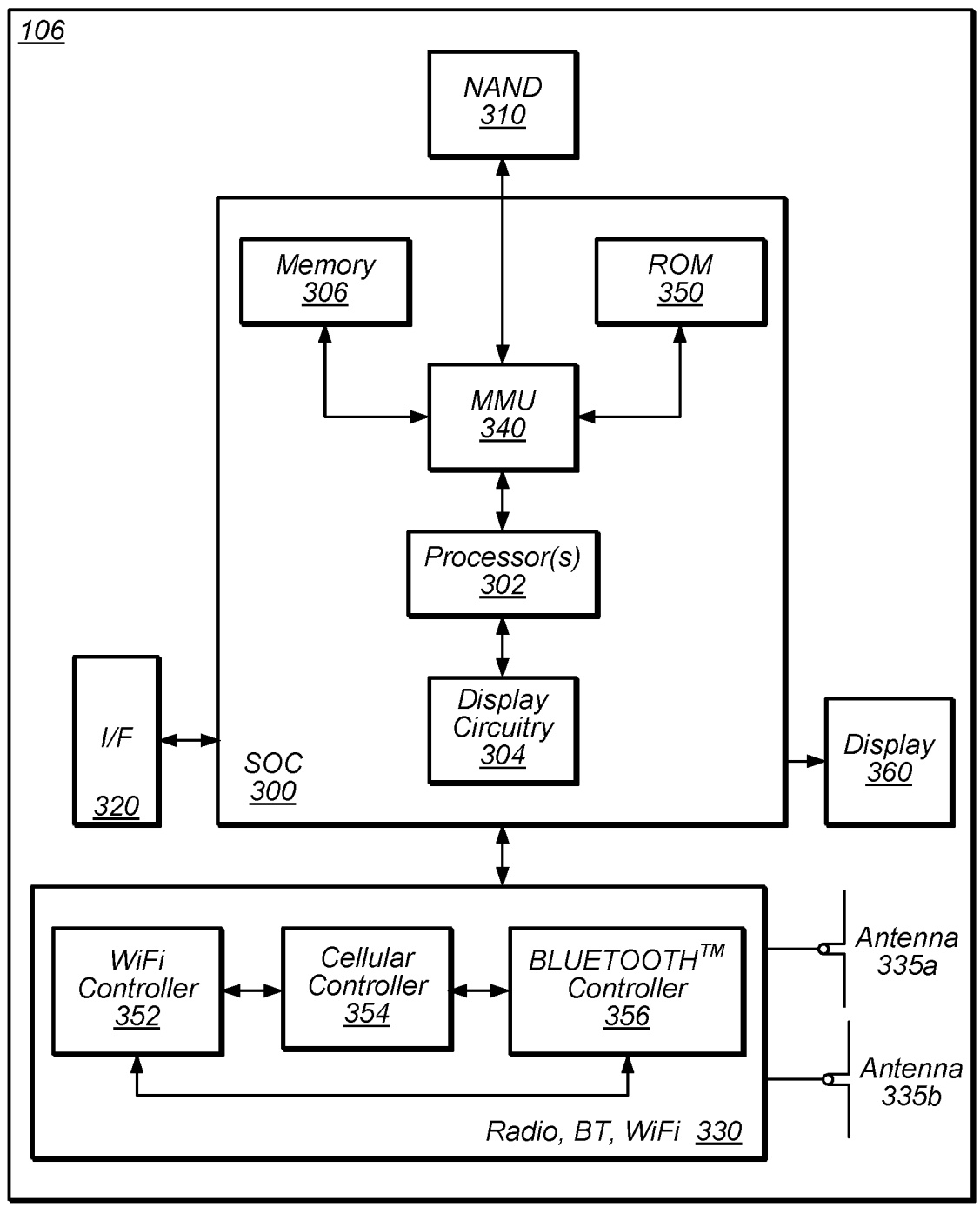
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to perform cellular communication using modular control channel formats for uplink control information. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform cellular communication using modular control channel formats for uplink control information according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. NR controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing Wi-Fi preamble detection, e.g., for detecting Wi-Fi physical layer preambles transmitted in unlicensed frequency bands that might be relevant to possible communication in unlicensed spectrum by the UE 106. As another possibility, the cellular controller 354 may include hardware and/or software components for generating Wi-Fi physical layer preamble signals, e.g., for transmitting as part of uplink communications by the UE 106 that occur in unlicensed frequency bands.

Figure 4:
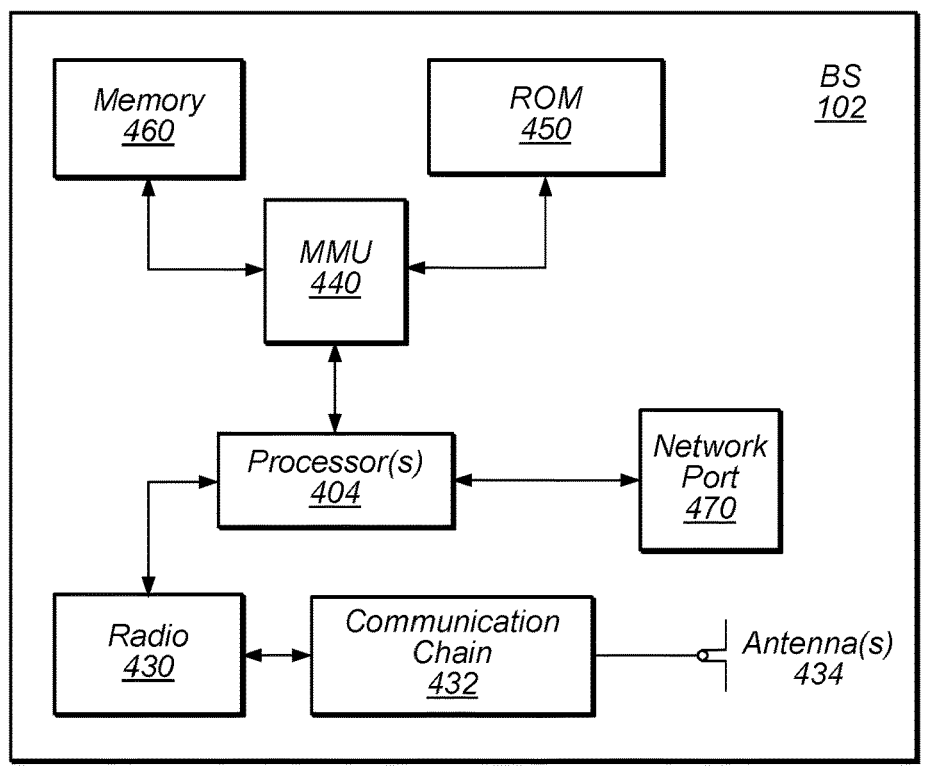
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for wireless devices to perform cellular communication using modular control channel formats for uplink control information.

Figure 5:
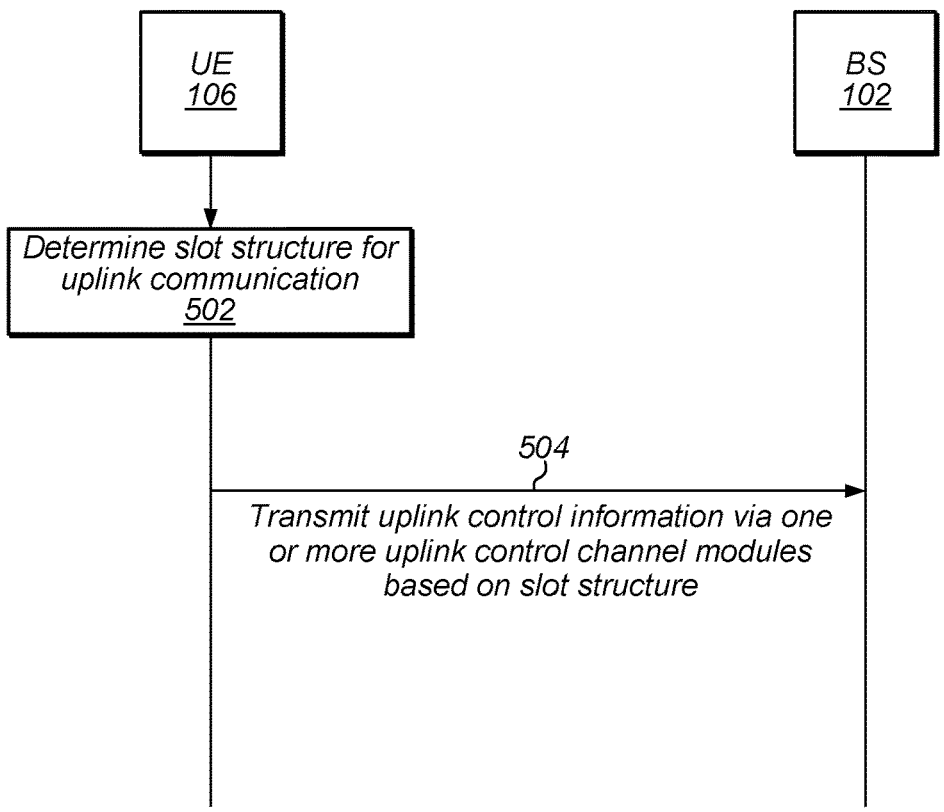
FIG. 5 is a communication flow diagram illustrating aspects of an exemplary possible method for performing cellular communication using modular control channel formats for uplink control information, according to some embodiments.

FIG. 5—Modular Control Channel Formats for Uplink Control Information

FIG. 5 is a flowchart diagram illustrating a method for a wireless device (e.g., a cellular base station or wireless user equipment (UE) device) to perform cellular communication using modular control channel formats for uplink control information, according to some embodiments.

Aspects of the method of FIG. 5 may be implemented by a wireless device and a cellular base station, such as a UE 106 and a BS 102 illustrated in and described with respect to various of the Figures herein, or more generally in conjunction with any of the computer systems or devices shown in the above Figures, among other devices, as desired. Note that while at least some elements of the method of FIG. 5 are described in a manner relating to the use of communication techniques and/or features associated with NR and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the UE may determine a slot structure for uplink communication. The slot structure may be selected (e.g., by a cellular base station serving the UE) from at least two possible slot structures. For example, at least according to some embodiments, it may be possible to employ a 7 symbol slot structure or a 14 symbol slot structure according to NR, at least for subcarrier spacing configurations up to 60 kHz.

The UE may determine which slot structure is in use in any of a variety of ways. As one possibility, the slot structure may be indicated by the UE's serving base station in broadcast system information. As another possibility, slot structure may be indicated by the UE's serving base station in downlink control information scheduling upcoming communication slots. Other techniques may also be used, as desired.

According to some embodiments, the UE may further determine a slot type/format for the uplink communication. For example, there may be multiple possible types of uplink communication slots, such as an uplink centric communication slot (e.g., that provides mostly uplink symbols but also provides at least one downlink symbol for providing downlink control information and/or for other purposes), and an uplink only communication slot (e.g., that provides only uplink symbols). In some instances, there may also be a downlink centric communication slot type (e.g., that provides mostly downlink symbols but also provides at least one uplink symbol for providing uplink control information and/or for other purposes). The slot type/format for each uplink communication slot may be determined by the UE based at least in part on downlink control information provided by the serving base station (e.g., in the same slot, in the case of an uplink centric slot, or in a previous slot, in the case of an uplink only slot, according to some embodiments).

For example, the base station may occasionally or continuously schedule upcoming uplink and/or downlink transmission slots for communication with one or more wireless devices (e.g., including UE 106) served by the base station. The uplink and downlink transmission slots may be selected from multiple possible uplink transmission slot types and multiple possible downlink transmission slot types, at least according to some embodiments. For example, the multiple possible uplink transmission slot types may include the previously mentioned uplink only and uplink centric transmission slots, while the multiple possible downlink transmission slot types may include a downlink only transmission slot and the previously mentioned downlink centric transmission slot, as one possibility.

The uplink and downlink transmission slot types may be dynamically selected by the BS 102 from the multiple possible uplink transmission slot types and the multiple possible downlink transmission slot types for any of a variety of possible reasons. Having flexibility in slot types to choose from may allow the BS 102 to schedule transmission slots in an efficient manner, for example in view of how much downlink data is buffered at the base station for each wireless device served by the base station, how much uplink data is buffered at each wireless device served by the base station (e.g., which may be known by the BS 102 based on buffer status reports received from these wireless devices), and/or any of various other possible considerations.

The BS 102 and the UE 106 (as well as the BS 102 and one or more other wireless devices served by the BS 102, potentially) may perform wireless communication according to the scheduled uplink and/or downlink transmission slots. In 504, e.g., as part of the wireless communication between the UE and the BS, the UE may transmit uplink control information to the BS via one or more uplink control channel modules. The number of uplink control channel modules used in a given slot may depend on the slot structure, e.g., including how many symbols are included in the slot. For example, for a slot having a 7 symbol slot structure, one uplink control channel module may be used. For a slot having a 14 symbol slot structure, two uplink control channel modules may be used.

A structure of the uplink control channel module(s) in a given slot may further depend on the slot type of that slot, at least in some instances. For example, for an uplink centric slot, there may be fewer uplink symbols per slot than for an uplink only slot, and so it may be the case that an uplink control channel module structure having fewer symbols is used for a slot having an uplink centric slot type than for a slot having an uplink only slot type. As one possibility, the uplink control channel module structure may be selected from a 5 symbol uplink control channel module (e.g., which may be used for uplink centric slot types) or a 7 symbol uplink control channel module (e.g., which may be used for uplink only slot types). Alternatively, one uplink control channel module structure may be used regardless of the slot type. For example, a 5 symbol uplink control channel module may be used for both uplink centric slot types and for uplink only slot types, as one possibility. Note that other uplink control module structures may also or alternatively be used, and/or uplink control module structures may be selected differently, as desired.

Further, the UE may determine a format of the uplink control channel module(s) used to transmit uplink control information for a given frame. The format may be selected from multiple possible formats, which may differ with respect to how many of the symbols of the uplink control channel module are used for reference signals and how many of the symbols are used for data bits (e.g., the uplink control information), and/or with respect to which symbols of the uplink control channel module are used for reference signals and which are used for data bits. The UE may determine which format to use based on any of a variety of considerations, potentially including (but not limited to) the amount of uplink control information to be provided (e.g., whether there is just ACK/NACK information to be provided, or also channel quality indicator (CQI)/channel state information (CSF) and/or other control information to be provided), the current channel conditions (e.g., as a higher pilot to data ratio may be desirable in poorer channel conditions), and/or any of various other possible factors.

Note that while a 'long format' uplink control channel that utilizes modular control channel structures/formats that span multiple symbols, such as primarily described with respect to FIG. 5, may be used in some instances, it should be noted that it may also be possible that a UE be configured to also or alternatively utilize a 'short format' uplink control channel in some instances. For example, an uplink control channel that spans just one (or an otherwise small number) of symbols may be used in conjunction with downlink centric slot types (e.g., which may include relatively few uplink symbols), and/or for UEs that have higher link budgets (e.g., for which a more compact uplink control channel may thus be suitable), according to some embodiments.

FIGS. 6-11—Exemplary Possible Long Format Physical Uplink Control Channel Design for 5G NR FIGS. 6-11 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

According to some embodiments, 5G NR may support multiple formats for uplink control channels. These may include a short duration format, e.g., that may be transmitted in or around the last transmitted uplink symbol(s) of a slot, and a long duration format, e.g., that may be transmitted over multiple uplink symbols of a slot, e.g., to improve coverage. The short format may provide faster uplink control feedback, while the long format may help with link budget optimization and coverage, according to some embodiments.

For the long format, it may be the case that Discrete-Fourier-Transform-Spread-Orthogonal-Frequency-Division-Multiplexing (DFT-S-OFDM) may be supported, e.g., for lower peak to average power (PAPR). Transmit diversity may also be supported, e.g., such that multiple transmit antennas may be used in conjunction with control signal transmissions for the long format uplink control channel. Additionally, in at least some instances, intraslot frequency hopping may also be supported, and/or time division multiplexing between reference signals and uplink control information may be supported (e.g., at least for DFT-S-OFDM).

Figure 6:
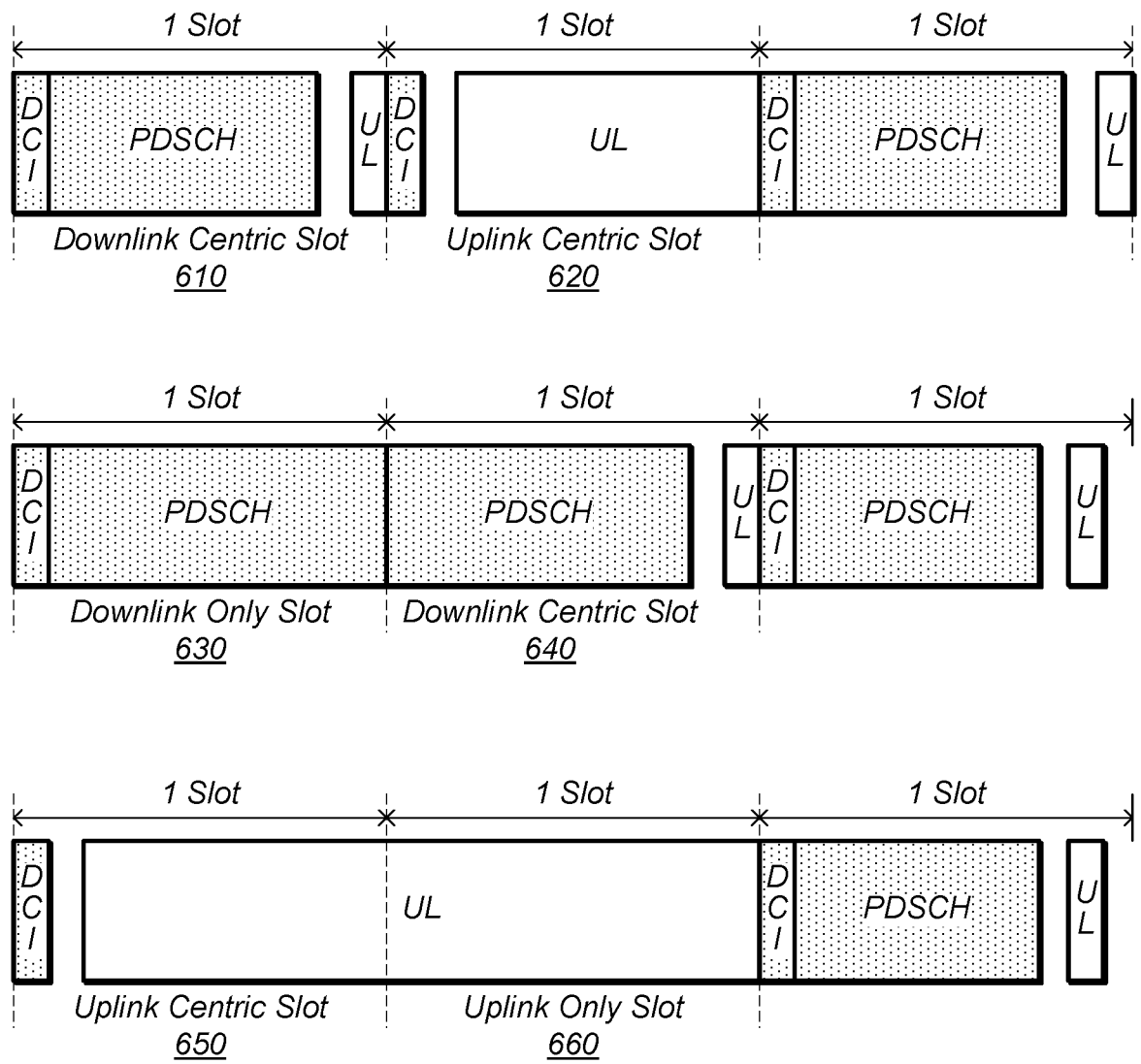
FIG. 6 illustrates several exemplary possible 5G NR slot formats, according to some embodiments.

FIG. 6 illustrates a variety of exemplary possible slot types/formats that may be used in 5G NR, according to some embodiments. As shown, the slot formats may include a downlink centric slot (e.g., slots 610, 640), an uplink centric slot (e.g., slots 620, 650), a downlink only slot (e.g., slot 630), and an uplink only slot (e.g., slot 660).

According to some embodiments, the downlink centric slot format may include both downlink control information and data and uplink control information (e.g., HARQ ACK/NACK) for the downlink data within a single slot. The uplink centric slot format may include downlink control information (e.g., scheduling information and potentially downlink HARQ ACK/NACK, e.g., for previous uplink data) and uplink data and control information within a single slot. The downlink only slot format may include downlink data and possibly downlink control information. Similarly, the uplink unidirectional slot format may include uplink data and possibly uplink control information.

As shown, the downlink centric slots may include a portion (e.g., one or an otherwise relatively small number of symbols) for providing downlink control information (e.g., via a NR-physical downlink control channel (NR-PDCCH)), a portion (e.g., a majority of the symbols of the slot) for providing downlink data (e.g., via a NR-physical downlink shared channel (NR-PDSCH)), and a portion (e.g., one or an otherwise relatively small number of symbols for uplink control information (e.g., a short format version of the NR-physical uplink control channel (NR-PUCCH)), with a switching gap (e.g., ½ symbol, 1 symbol, etc.) between downlink and uplink portions.

As shown, the uplink centric slots may include a portion (e.g., one or an otherwise relatively small number of symbols) for providing downlink control information, e.g., via the NR-PDCCH, and a portion (e.g., a majority of the symbols of the slot) for providing uplink data (e.g., via a NR-physical uplink shared channel (NR-PUSCH) and/or uplink control information (e.g., via a long format version of the NR-PUCCH), with a switching gap between downlink and uplink portions.

Note that it may be possible to provide slot aggregation using the illustrated slot formats, for example by scheduling an uplink centric slot followed by one or more uplink only slots, and/or by scheduling one or more downlink only slots followed by a downlink centric slot, among various possibilities. For example, as shown, downlink only slot 630 may include a symbol for the NR-PDCCH, which may indicate the slot format, and may also include an indication of how many additional downlink only and/or downlink centric slots follow the first unidirectional downlink slot (e.g., downlink centric slot 640, in the illustrated example) and/or may include an indication of when to transmit uplink HARQ ACK/NACK information for the downlink slot(s) (e.g., in downlink centric slot 640 following downlink only slot 630, in the illustrated example). In this case, it may be possible to skip the NR-PDCCH in one or more of the aggregated slots after the first aggregated slot.

Similarly, for uplink slot aggregation, an indication of any slots scheduled to use the uplink only format may be provided prior to the scheduled uplink only slot(s), e.g., using a downlink centric (or possibly downlink only or uplink centric) slot, at least according to some embodiments. For example, as shown, uplink centric slot 650 may be provided prior to uplink only slot 660, and may indicate the slot format, and may also include an indication of how many additional uplink only slots follow the first uplink centric slot (e.g., uplink only slot 660, in the illustrated example).

For some or all of the slot formats, there may further be multiple possible slot structures. For example, as one possibility, a slot may include 14 symbols or may include 7 symbols (e.g., at least for subcarrier spacing up to 60 kHz). Accordingly, it may be desirable to provide a robust and scalable control channel design for the long format NR-PUCCH that can support different slot structures and provide a variety of design features (e.g., DFT-S-OFDM support, transport diversity support, intraslot frequency hopping, and/or TDM of RS and UCI), that doesn't rely on a large number of control channel formats. In other words, a modular design for the long duration control channel may be desirable, at least in some instances.

For a system in which 7- or 14-symbol slot structures are possible, and in which at least uplink centric and uplink only slot formats are possible, as one possibility a 7 symbol slot may include either 1 symbol for DCI+5 uplink symbols+1 guard symbol (e.g., for an uplink centric slot) or 7 uplink symbols (e.g., for an uplink only slot), and a 14 symbol slot may include 2-3 symbols for DCI+10-11 uplink symbols+1 guard symbol (e.g., for an uplink centric slot) or 14 uplink symbols (e.g., for an uplink only slot). In such a system, one possibility for the uplink control channel modules may include providing a 5 symbol NR-PUCCH module and a 7 symbol NR-PUCCH module.

Figure 7:
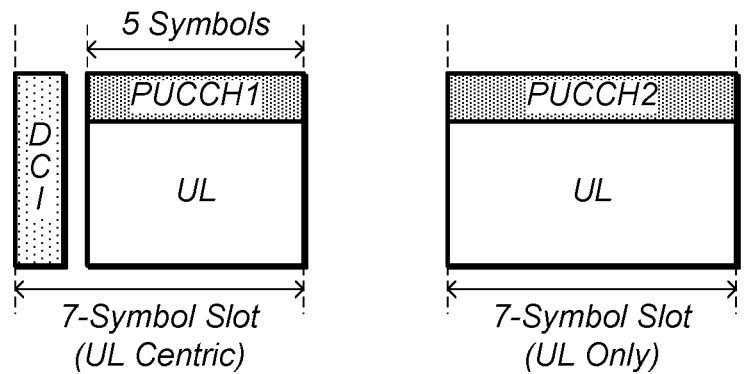
FIG. 7 illustrates exemplary possible 5G NR uplink control channel modules that can be used for slots having a 7 symbol slot structure, according to some embodiments.

FIG. 7 illustrates the possible use of such NR-PUCCH modules in the 7 symbol slot structure for the uplink centric slot format and for the uplink only slot format. As shown, for the uplink centric slot format, one 5 symbol PUCCH module may be included, while for the uplink only slot format, one 7 symbol PUCCH module may be included.

Figure 8:
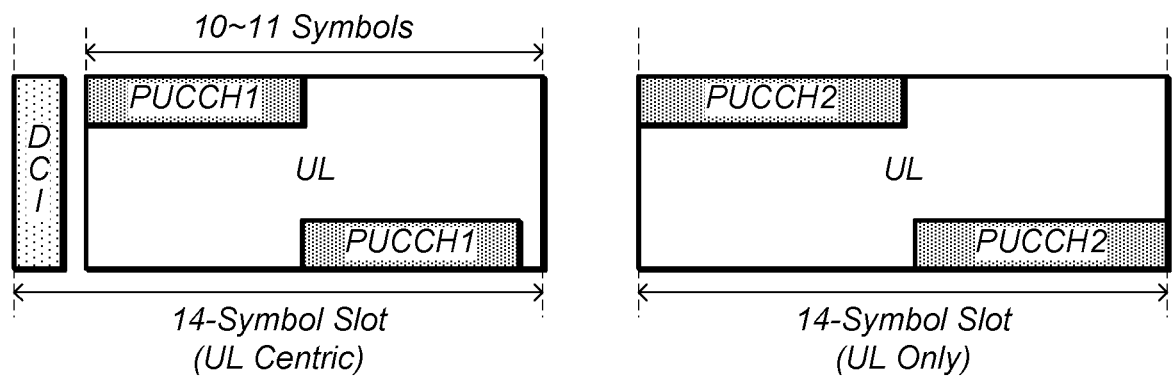
FIG. 8 illustrates exemplary possible 5G NR uplink control channel modules that can be used for slots having a 14 symbol slot structure, according to some embodiments.

FIG. 8 illustrates the possible use of such NR-PUCCH modules in the 14 symbol slot structure for the uplink centric slot format and for the uplink only slot format. As shown, for the uplink centric slot format, two 5 symbol PUCCH modules may be included, while for the uplink only slot format, two 7 symbol PUCCH module may be included. In both cases, intraslot frequency hopping may be used, e.g., such that the first PUCCH module is provided using different subcarriers than the second PUCCH module.

Note that the exemplary scenarios illustrated in FIGS. 7-8 are not intended to be limiting to the disclosure as a whole, and that numerous other possible ways of using NR-PUCCH modules in conjunction with such slot structures are also possible. As one such possibility, the uplink portion of an uplink centric slot could include a different number of symbols (e.g., 4, 6, etc., for a 7 symbol slot; 7, 8, 9, 12, etc., for a 14 symbols slot). As another such possibility, it should be noted that the two hopping segments of the PUCCH within a 14 symbol slot, as shown in FIG. 8, may be different NR-PUCCH modules. For example, the first segment could be one type of module (e.g., a 5 symbol NR-PUCCH module), while the second segment could be a different type of module (e.g., a 7 symbol NR-PUCCH module). As another example, the segments may have different formats (e.g., even if the module types are the same), for example, in which the RS ratios and/or locations within a segment may differ between the two segments of a given slot.

Figure 9:
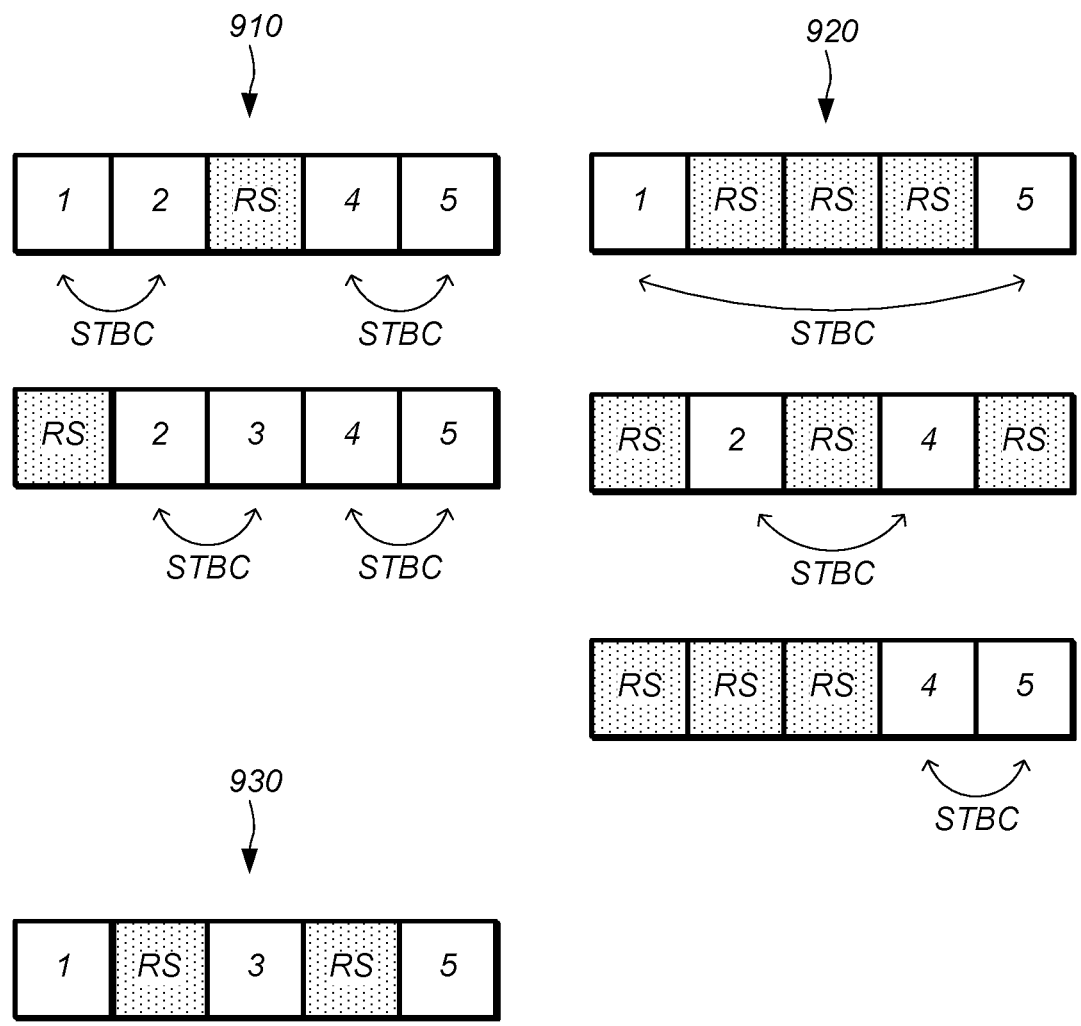
FIG. 9 illustrates exemplary possible 5G NR uplink control channel module formats for a 5 symbol uplink control channel module, according to some embodiments.

For example, for each of the PUCCH module structures (e.g., 5 symbols or 7 symbols), it may further be possible to select from multiple PUCCH module formats. FIG. 9 illustrates three such possible formats (along with multiple RS/UCI patterns for each) for a 5 symbol PUCCH module structure. As shown, a first format 910 may include more UCI bits with a lower RS ratio (e.g., 4 symbols may carry UCI while 1 symbol may carry RS), while a second format 920 may include fewer UCI bits with a higher RS ratio (e.g., 2 symbols may carry UCI while 3 symbols may carry RS). In either case, providing an even number of UCI symbols may allow for simple transmit diversity using space-time block codes (STBC), while still supporting single carrier waveforms. A third format 930, which may include an intermediate number of UCI bits and RS ratio (e.g., 3 symbols may carry UCI while 2 symbols may carry RS), is also shown. Other formats are also possible. Additionally, each format may be able to support various RS patterns, as shown. These may include front-loaded RS (e.g., which may be more time-line friendly/get channel estimation information to the BS sooner), distributed RS (e.g., which may be more resilient to high doppler), back-loaded RS (not shown), clustered RS, etc.

Figure 10:
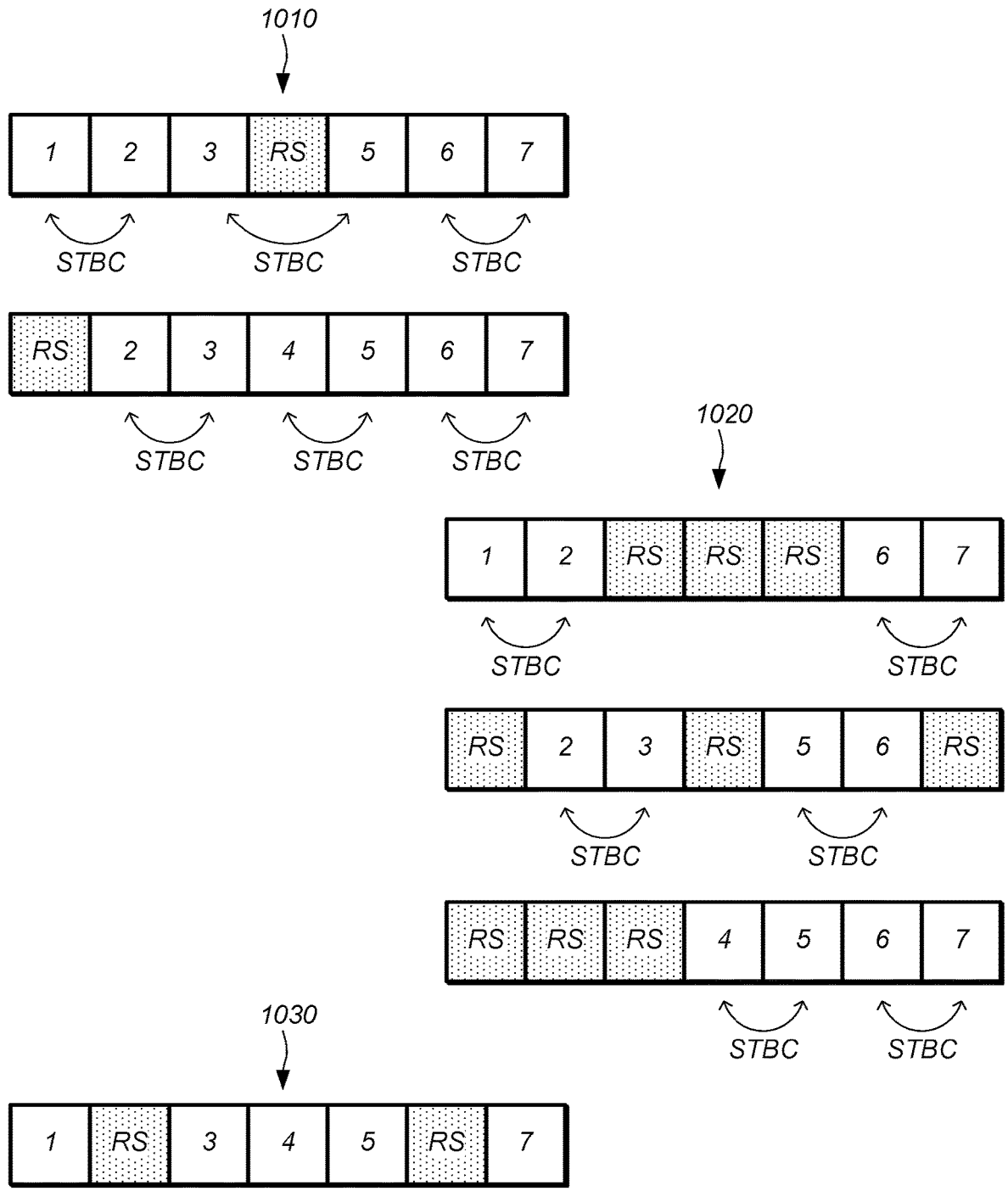
FIG. 10 illustrates exemplary possible 5G NR uplink control channel module formats for a 7 symbol uplink control channel module, according to some embodiments.

FIG. 10 similarly illustrates three such possible formats (along with multiple RS/UCI patterns for each) for a 7 symbol PUCCH module structure. As shown, a first format 1010 may include more UCI bits with a lower RS ratio (e.g., 6 symbols may carry UCI while 1 symbol may carry RS), while a second format 1020 may include fewer UCI bits with a higher RS ratio (e.g., 4 symbols may carry UCI while 3 symbols may carry RS). In these formats as well, providing an even number of UCI symbols may allow for simple transmit diversity using STBC, while still supporting single carrier waveforms. Again, a third format 1030, which may include an intermediate number of UCI bits and RS ratio (e.g., 5 symbols may carry UCI while 2 symbols may carry RS), is also shown. Other formats are also possible. Similar to the 5 symbol PUCCH module structure, each format may be able to support various RS patterns, as shown, potentially including but not limited to front-loaded RS, distributed RS, back-loaded RS, and/or clustered RS.

Figure 11:
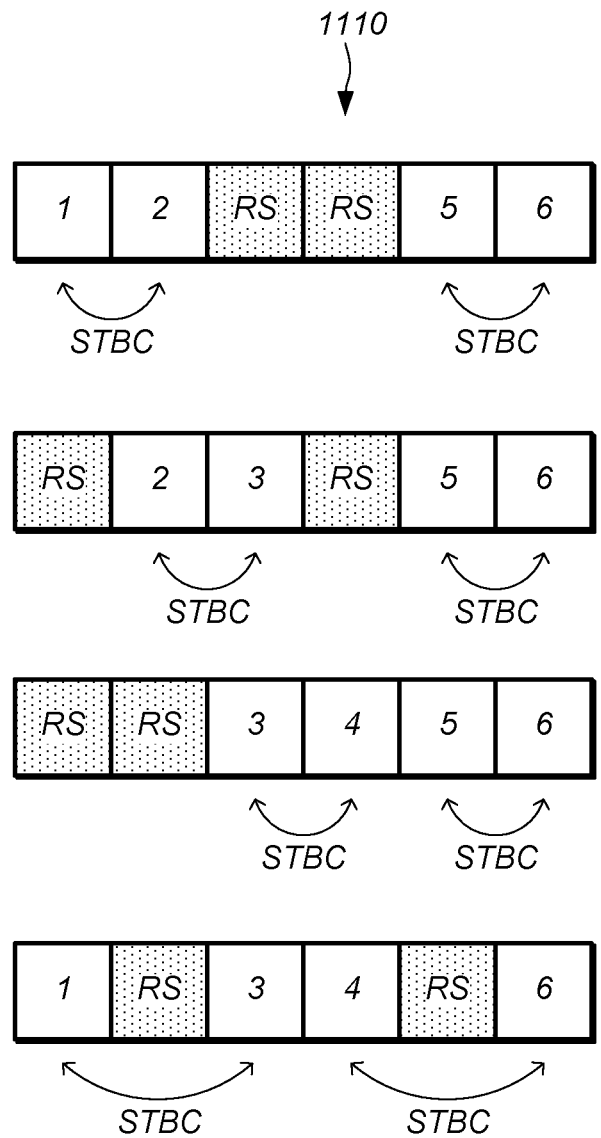
FIG. 11 illustrates exemplary possible 5G NR uplink control channel module formats for a 6 symbol uplink control channel module, according to some embodiments.

Furthermore, additional PUCCH module structures (e.g., in addition or as alternatives to 5- and 7-symbol PUCCH module structures) may also be possible. As one such example, FIG. 11 illustrates a possible 6 symbol PUCCH module structure, including several possible RS/UCI patterns. As shown, the 6 symbol PUCCH module structure 1110 may include 4 symbols carrying UCI and 2 symbols carrying RS. Similar to the PUCCH module structures previously illustrated and described herein, such a structure may be able to support various RS patterns, as shown, potentially including but not limited to front-loaded RS, distributed RS, back-loaded RS, and/or clustered RS.

Note that the illustrated formats are provided by way of example only, and any number of additional structures, formats, and/or patterns for each format may also or alternatively be used, as desired. For example, structures with different numbers of symbols, patterns with different symbol ordering, and/or formats with different proportions of UCI to RS may be used, among various possibilities.

In the following further exemplary embodiments are provided.

One set of embodiments may include a method, comprising: by a wireless device: determining a slot structure for uplink communication from at least a first slot structure and a second slot structure, wherein the first slot structure comprises fewer symbols per slot than the second slot structure; and transmitting uplink control information via an uplink control channel, wherein the uplink control channel has a format that is modular, wherein one uplink control module is used for the first slot structure, wherein two uplink control modules are used for the second slot structure.

Another set of embodiments may include a method, comprising: by a wireless device: determining a slot structure for uplink communication, wherein the slot structure is selected from at least a first slot structure and a second slot structure; and transmitting uplink control information via one or more uplink control channel modules during a slot, wherein a number of uplink control channel modules on which uplink control information is transmitted during the slot is based at least in part on the slot structure for uplink control communication.

According to some embodiments, the first slot structure comprises a 7 symbol slot structure, wherein the second slot structure comprises a 14 symbol slot structure.

According to some embodiments, the method further comprises, by the wireless device: determining a slot type for the uplink communication; and determining an uplink control channel module structure for the uplink control modules based at least in part on the slot type.

According to some embodiments, the slot type is selected from at least a first uplink slot type and a second uplink slot type.

According to some embodiments, the first uplink slot type comprises an uplink-only slot type, wherein the second uplink slot type comprises an uplink-centric slot type.

According to some embodiments, the uplink control channel module structure is selected from at least a 5 symbol uplink control channel module or a 7 symbol uplink control channel module.

According to some embodiments, the method further comprises, by the wireless device: determining an uplink control channel module format for the uplink control channel module(s), wherein the uplink control channel module format is selected from at least a first uplink control channel module format and a second uplink control channel module format, wherein the first uplink control channel module format comprises more symbols for uplink control information and fewer symbols for reference signals than the second uplink control channel module format.

A still further exemplary set of embodiments may include an apparatus, comprising a processing element configured to cause a device to implement any or all parts of the preceding examples.

Another exemplary set of embodiments may include a device, comprising: an antenna; a radio coupled to the antenna; and a processing element operably coupled to the radio, wherein the device is configured to implement any or all parts of the preceding examples.

A yet further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a non-transitory computer-readable memory medium; and
a processor coupled to the memory medium and configured to cause a wireless user equipment (UE) device to:
determine a slot structure for uplink communication;
determine an uplink control channel module structure and a number of symbols for reference signals of the UE device within the uplink control channel module structure to use for transmitting uplink control information via an uplink control channel, wherein the uplink control channel module structure is determined from a plurality of uplink control channel module structures corresponding to different numbers of symbols, wherein the number of symbols for reference signals of the uplink control module structure is determined based at least in part on an amount of the uplink control information to be transmitted, wherein, when the number of symbols for reference signals is determined to be one and the number of symbols of the determined uplink control channel module structure is five, the reference signal is located in a third symbol in the uplink control channel module structure; and
transmit the uplink control information via the uplink control channel according to the uplink control channel module structure and the determined number of symbols for reference signals within the uplink control channel module structure, wherein the uplink control channel has a format that is modular, wherein two of the uplink control module structures are used for the uplink control information transmission.

2. The apparatus of claim 1,
wherein the two determined uplink control module structures are transmitted on different subcarriers.

3. The apparatus of claim 1,
wherein the two determined uplink control module structures are transmitted on different symbols.

4. The apparatus of claim 1, wherein the processor is further configured to cause the UE device to:
determine a slot type for the uplink communication from at least a first uplink slot type and a second uplink slot type; and
wherein the uplink control channel module structure is determined based at least in part on the slot type.

5. The apparatus of claim 4, wherein to determine the uplink control channel module structure, the processor is further configured to cause the UE device to:

select a first uplink control channel module structure for the first uplink slot type; and
select a second uplink control channel module structure for the second uplink slot type,
wherein the first uplink slot type comprises more uplink symbols than the second uplink slot type, wherein the first uplink control channel module structure comprises more symbols than the second uplink control channel module structure.

6. The apparatus of claim 1, wherein the processor is further configured to cause the UE device to:
determine a number of symbols for uplink control information of each of the two uplink control module structures.

7. The apparatus of claim 1, wherein the processor is further configured to cause the UE device to:
determine an order of symbols for uplink control information and symbols for reference signals of each of the determined uplink control module structures.

8. A method, comprising:
by a wireless user equipment (UE) device:
determining a slot structure for uplink communication;
determining an uplink control channel module structure and a number of symbols for reference signals of the UE device within the uplink control channel module structure to use for transmitting uplink control information via an uplink control channel, wherein the uplink control channel module structure is determined from a plurality of uplink control channel module structures corresponding to different numbers of symbols, wherein the number of symbols for reference signals within the uplink control channel module structure is determined based at least in part on an amount of the uplink control information to be transmitted, wherein, when the number of symbols for reference signals is determined to be two and the number of symbols of the determined uplink control channel module structure is five, the reference signals are located in a second and fourth symbol in the uplink control channel module structure; and
transmitting the uplink control information via one or more uplink control channel modules according to the uplink control channel module structure and the determined number of symbols for reference signals within the uplink control channel module structure during a slot.

9. The method of claim 8,
wherein a first slot structure comprises a 7 symbol slot structure, wherein a second slot structure comprises a 14 symbol slot structure.

10. The method of claim 8, further comprising, by the UE device:
determining a slot type for the uplink communication,
wherein the uplink control channel module structure for the uplink control modules is determined based at least in part on the slot type.

11. The method of claim 10,
wherein the slot type is determined from at least a first uplink slot type and a second uplink slot type.

12. The method of claim 11,
wherein the first uplink slot type comprises an uplink-only slot type,
wherein the second uplink slot type comprises an uplink-centric slot type.

13. The method of claim 10,
wherein the uplink control channel module structure is determined from at least a 5 symbol uplink control channel module or a 7 symbol uplink control channel module.

14. The method of claim 8, further comprising, by the UE device:
determining an uplink control channel module format for the uplink control channel module(s),
wherein the uplink control channel module format is determined from at least a first uplink control channel module format and a second uplink control channel module format,
wherein the first uplink control channel module format comprises more symbols for the uplink control information and fewer symbols for reference signals than the second uplink control channel module format.

15. A wireless user equipment (UE) device, comprising:
an antenna;
a radio operably coupled to the antenna; and
a processor operably coupled to the radio;
wherein the UE device is configured to:
determine a slot structure for uplink communication;
determine an uplink control channel module structure and a number of symbols for reference signals of the UE device within the determined uplink control channel module structure to use for transmitting uplink control information via an uplink control channel, wherein the uplink control channel module structure is determined from a plurality of uplink control channel module structures corresponding to different numbers of symbols, wherein the number of symbols for reference signals within the uplink control channel module structure is determined based at least in part on an amount of the uplink control information to be transmitted, wherein, when the number of symbols of the determined uplink control channel module structure is five:
when the number of symbols for reference signals is determined to be one, the reference signal is located in a third symbol in the uplink control channel module structure; and
when the number of symbols for reference signals is determined to be two, the reference signals are located in a second and fourth symbol in the uplink control channel module structure; and
transmit the uplink control information via one or more uplink control channel modules according to the uplink control channel module structure and the determined number of symbols for reference signals within the uplink control channel module structure during a slot.

16. The UE device of claim 15, wherein a first slot structure comprises fewer symbols per slot than a second slot structure, wherein the UE device is further configured to:
select one uplink control channel module on which to transmit uplink control information for the first slot structure; and
select two uplink control channel modules on which to transmit uplink control information for the second slot structure.

17. The UE device of claim 16,
wherein when two uplink control channel modules are selected, the uplink control modules are transmitted on different subcarriers and on different symbols of the slot.

18. The UE device of claim 15, wherein the UE device is further configured to:
determine a slot type for the uplink communication from at least a plurality of possible uplink slot types; and
wherein the uplink control channel module structure is determined based at least in part on the slot type.

19. The UE device of claim 18, wherein to determine the uplink control channel module structure, the UE device is further configured to:
select an uplink control channel module structure comprising more uplink symbols for an uplink slot type comprising more uplink symbols than for an uplink slot type comprising fewer uplink symbols.

20. The UE device of claim 15, wherein the UE device is further configured to determine one or more of:
a number of symbols for the uplink control information of each of the one or more uplink control channel modules; or
an order of symbols for the uplink control information and symbols for reference signals of each of the one or more uplink control channel modules.

* * * * *